US009729391B2

(12) United States Patent
Goldschlager et al.

(10) Patent No.: US 9,729,391 B2
(45) Date of Patent: Aug. 8, 2017

(54) METHOD AND APPARATUS FOR PATH INDICATION

(71) Applicant: Marvell International Ltd., Hamilton (BM)

(72) Inventors: Robi Goldschlager, Tel-Aviv (IL); Gad Hutt, Sunnyvale, CA (US); Ronen Tausi, Raanana (IL)

(73) Assignee: Marvell International Ltd., Hamilton (BM)

( * ) Notice: Subject to any disclaimer, the term of this patent is extended or adjusted under 35 U.S.C. 154(b) by 588 days.

(21) Appl. No.: 14/056,237

(22) Filed: Oct. 17, 2013

(65) Prior Publication Data
US 2014/0105064 A1    Apr. 17, 2014

Related U.S. Application Data

(60) Provisional application No. 61/715,007, filed on Oct. 17, 2012, provisional application No. 61/715,009, filed on Oct. 17, 2012.

(51) Int. Cl.
*H04L 12/24* (2006.01)
*H04L 12/931* (2013.01)

(52) U.S. Cl.
CPC .............. *H04L 41/08* (2013.01); *H04L 41/12* (2013.01); *H04L 49/354* (2013.01); *H04L 41/0803* (2013.01); *H04L 41/0816* (2013.01)

(58) Field of Classification Search
CPC ....... H04L 41/08; H04L 41/12; H04L 49/354; H04L 41/0803; H04L 41/0816
See application file for complete search history.

(56) References Cited

U.S. PATENT DOCUMENTS

| | | | | |
|---|---|---|---|---|
| 2007/0297349 A1* | 12/2007 | Arkin | ...................... | H04L 12/66 370/255 |
| 2008/0049927 A1* | 2/2008 | Wiley | ..................... | H04L 65/80 379/230 |
| 2008/0310430 A1* | 12/2008 | He | ........................ | H04L 12/462 370/400 |
| 2009/0141707 A1* | 6/2009 | Kavanaugh | ......... | H04L 63/0272 370/352 |

(Continued)

OTHER PUBLICATIONS

Robi Goldschlager et al., U.S. Appl. No. 14/102,665, "Network Traffic View", filed Dec. 11, 2013.

(Continued)

*Primary Examiner* — Walter Divito
*Assistant Examiner* — Anthony Luo

(57) ABSTRACT

Aspects of the disclosure provide a method for generating a Layer 2 path indication by a processor. The method includes receiving, by the processor, a request for providing a Layer 2 path indication between a first host and a second host in a network. Nodes in the network are configured to form a plurality of sub-networks to enable data transfer from one host to another host within a sub-network via a Layer 2 path formed of a sequence of intermediate nodes in the same sub-network. The method further includes identifying, by the processor, a sub-network within the network to which the first host and the second host belong, and determining, by the processor, within the sub-network a sequence of intermediate nodes on a path for Layer 2 data transfer between the first host and the second host.

20 Claims, 6 Drawing Sheets

(56) References Cited

U.S. PATENT DOCUMENTS

2011/0066753 A1* 3/2011 Wang .................... H04L 45/586
709/238
2012/0087280 A1* 4/2012 Shand .................... H04L 41/12
370/255

OTHER PUBLICATIONS

Robi Goldschlager et al., U.S. Appl. No. 14/078,013, "Cable Discovery", filed Nov. 12, 2013.
Robi Goldschlager et al., U.S. Appl. No. 14/073,033, "Link Attributes Display", filed Nov. 6, 2013.

* cited by examiner

| VLAN ID | PORT MEMBERSHIP |
|---|---|
| VLAN-1. | (P1, S1) (P2, S1) (P6, S1)<br>(P2, S2) (P3, S2) (P7, S2) (P8, S2)<br>(P1, S3) (P5, S3) (P6, S3) |
| VLAN-2. | (P3, S1) (P4, S1) (P6, S1)<br>(P1, S2) (P7, S2) (P8, S2)<br>(P6, S3) (P3, S3) |
| VLAN-3. | (P4, S1) (P6, S1)<br>(P4, S2) (P5, S2) (P7, S2) (P8, S2)<br>(P2, S3) (P4, S3) (P6, S3) |
| | |

*FIG. 2C*

| SWITCH | PORT | CONNECTED DEVICE | CONNECTED DEVICE TYPE |
|---|---|---|---|
| S1 | P1 | H1 | HOST |
| S1 | P2 | H2 | HOST |
| S1 | P3 | H3 | HOST |
| S1 | P4 | H4 | HOST |
| S1 | P5 | H5 | HOST |
| S1 | P6 | S2 | SWITCH |
| S2 | P1 | H6 | HOST |
| S2 | P2 | H7 | HOST |
| S2 | P3 | H8 | HOST |
| S2 | P4 | H9 | HOST |
| S2 | P5 | H10 | HOST |
| S2 | P6 | 102 | ROUTER |
| S2 | P7 | S1 | SWITCH |
| S2 | P8 | S3 | SWITCH |
| S3 | P1 | H11 | HOST |
| S3 | P2 | H12 | HOST |
| S3 | P3 | H13 | HOST |
| S3 | P4 | H14 | HOST |
| S3 | P5 | H15 | HOST |
| S3 | P6 | S2 | SWITCH |

*FIG. 2D*

```
//recursive routine
findSwitch(chain resultChain, switch targetSwitch, vlan V, switch currentSwitch ) {
   if targetSwitch = currentSwitch return found
         for p IN ports(currentSwitch)
               if (p memberOf V) and connectionType(p) = switch
                  if findSwitch(resultChain,targetSwitch, V,connectedDevice(p))
                     //ASSERT found a path to target
//chain element is a pair <switch, connecting port>
//ASSERT rest of chain from here already created by findSwitch, therefore we
//have to prepend current "head"
                     prepend(resultChain,createChainElement(connectedDevice(p),p))
                                 return found
}

//main program
main(host H1, host H2) {
L1 = getWGlist(H1)
L2 = getWGlist(H2)

switch sizeOf(Intersection(L1,L2)) {
  case 0: //no intersection
      Display("Common WGs for H1 and H2")
  exit
  case 1:
      WG=memberOf(L1)
  otherwise WG = UserSelect(Intersection(L1,L2))
}
resultChain = createEmptyChain()
findSwitch(resultChain, getConnectedSwitch(H2), getVlan(WG),
getConnectedSwitch(H1));
if graphicDisplay
  graphDisplay(resultChain)
  else tabularDisplay(resultChain)
}
```

FIG. 4

METHOD AND APPARATUS FOR PATH INDICATION

INCORPORATION BY REFERENCE

This present disclosure claims the benefit of U.S. Provisional Application No. 61/715,007, "WORK GROUP PATH INDICATION" filed on Oct. 17, 2012, and U.S. Provisional Application No. 61/715,009, "AUTOMATIC WORK GROUP PROVISION" filed on Oct. 17, 2012, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A local area network (LAN) is a computer network that interconnects computers in a limited area such as a home, school, computer laboratory, or office building using network media. Further, in a LAN, computers can be grouped into domains, such as virtual LANs (VLANs) and the like. In an example, computers in the same VLAN communicate using Layer 2 or Layer 3 communication, while computers in different VLANs communicate only using higher layers, such as Layer 3 communication, and the like.

SUMMARY

Aspects of the disclosure provide a method for generating a Layer 2 path indication by a processor. The method includes receiving, by the processor, a request for providing a Layer 2 path indication between a first host and a second host in a network. Nodes in the network are configured to form a plurality of sub-networks to enable data transfer from one host to another host within a sub-network via a Layer 2 path formed of a sequence of intermediate nodes in the same sub-network. The method further includes identifying, by the processor, a sub-network within the network to which the first host and the second host belong, and determining, by the processor, within the sub-network a sequence of intermediate nodes on a path for Layer 2 data transfer between the first host and the second host.

In an embodiment, to identify the sub-network within the network to which both the first host and the second host belong, the method includes identifying one or more VLANs to which both the first host and the second host belong. Further, to identify the one or more VLANs to which both the first host and the second host belong, the method includes determining a first list of workgroups to which the first host belongs, determining a second list of workgroups to which the second host belongs, determining one or more workgroups that are common to both the first list and the second list, and determining the one or more VLANs corresponding to the one or more workgroups.

According to an aspect of the disclosure, for determining within the sub-network the sequence of intermediate nodes on the Layer 2 path for data transfer between the first node and the second node, the method includes sequentially determining the sequence of intermediate nodes that are connected via ports belonging to the VLAN. For example, the method includes identifying a port of the first host that belongs to the VLAN and identifying an intermediate node in the sub-network that is connected to the first host via the port.

Aspects of the disclosure provide an apparatus that includes a memory and a controller. The memory is configured to store a database of configurations for a network. Nodes in the network are configured to form a plurality of sub-networks to enable data transfer from one node to another node within a sub-network via a Layer 2 path formed of a sequence of intermediate nodes in the same sub-network. The controller is configured to receive a request for providing a Layer 2 path indication between a first host and a second host in the network, identify, based on the database of configurations of the network, a sub-network within the network to which the first host and the second host belong, and determine, based on the database of configurations of the network, within the sub-network a sequence of nodes on a Layer 2 path for data transfer between the first host and the second host.

Aspects of the disclosure provide a non-transitory computer readable medium storing program instructions for causing a processor to execute operations for providing a Layer 2 path indication. The operations include receiving, by the processor, a request for providing a Layer 2 path indication between a first host and a second host in a network. Nodes in the network are configured to form a plurality of sub-networks to enable data transfer from one node to another node within a sub-network via a Layer 2 path formed of a sequence of intermediate nodes in the same sub-network. The operations further include identifying, by the processor, a sub-network within the network to which the first host and the second host belong, and determining, by the processor, within the sub-network a sequence of nodes on a Layer 2 path for data transfer between the first host and the second host.

BRIEF DESCRIPTION OF THE DRAWINGS

Various embodiments of this disclosure that are proposed as examples will be described in detail with reference to the following figures, wherein like numerals reference like elements, and wherein:

FIGS. 2A-2D show tables storing network configurations according to an embodiment of the disclosure;

FIG. 4 shows an example of pseudo codes for a path indication algorithm according to an embodiment of the disclosure.

DETAILED DESCRIPTION OF EMBODIMENTS

Figure 1:
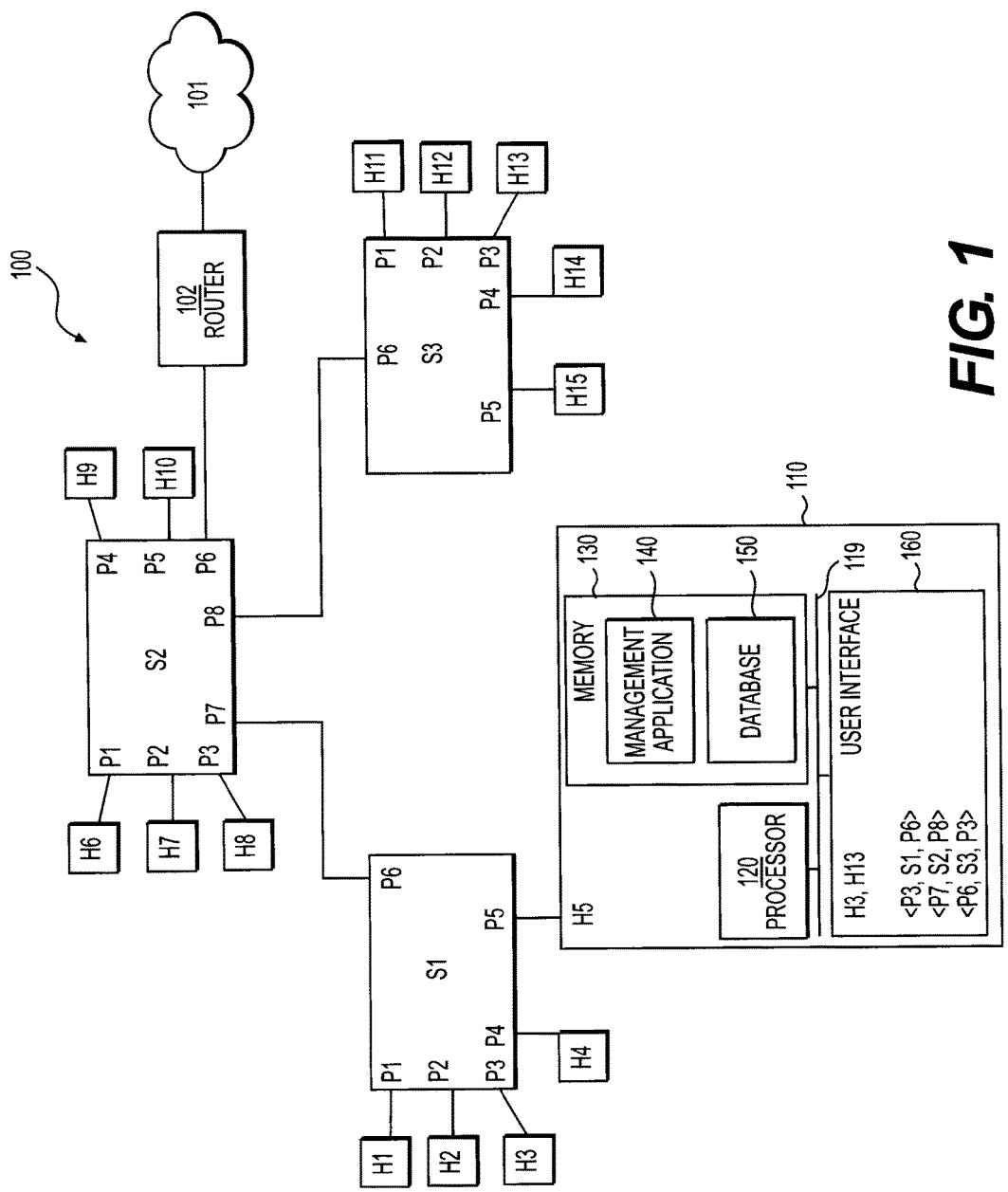
FIG. 1 shows a block diagram of a network example 100 according to an embodiment of the disclosure.

FIG. 1 shows a block diagram of a network example 100 according to an embodiment of the disclosure. In an example, the network 100 includes a plurality of devices coupled together to form a plurality of nodes in the network 100, such as host devices H1-H15 that form the host nodes, switch devices S1-S3 that form the switch nodes in the FIG. 1 example. Among the devices, at least one device, such as the host device 115, is configured to enable a Layer 2 path indication by a processor to determine a chain of switch devices for Layer 2 data transfer between two host devices in the network 100.

The network 100 can be any suitable network. In an example, the network 100 is a local area network (LAN)

100. The LAN 100 is a Layer 2 network that uses a data link protocol, such as Ethernet protocol, and the like, for communication between hosts in the LAN. In the FIG. 1 example, the LAN 100 is coupled to Internet 101 via a router 102 for example. In an example, communication to the Internet 101 crosses the border of the LAN 100 and continues using a higher level protocol, such as Layer 3 protocol, and the like.

The host devices H1-H15 can be any suitable devices, such as voice over IP (VoIP) phones, computers, laptops, TVs, servers, and the like that are configured to be a source of network traffic and/or a destination of network traffic. Generally, a host device includes one or more ports connected to the switch devices S1-S3. It is noted that when the host device includes multiple ports connected to the switch devices S1-S3, the host device is considered as a set of devices and each connection has his own MAC address. The host devices communicate via the switch devices.

The switch devices S1-S3 can be any suitable switch devices. Generally, a switch device includes a plurality of ports connected to host devices and/or other switch devices. The switch device is configured to receive a network traffic unit (e.g., a data link frame) from a port (e.g., ingress port) and forward the received network traffic unit to one or more ports (e.g., egress ports) based on network configuration information. In an embodiment, a switch device includes a plurality of tables storing network configuration information. The network configuration information includes, for example, port connectivity information of the switch device, port connectivity information of other switch devices in the LAN 100, virtual LAN (VLAN) configuration, and the like. In an example, the network configuration information is changed via a software program application by a network administrator.

Generally, a LAN can include a large amount of multicast and/or broadcast traffic. When the LAN has a large number of devices, such as hundreds of devices, traffic may be sent to unnecessary destinations. According to an aspect of the disclosure, the LAN 100 can be configured to include multiple sub-networks that use Layer 2 protocol for communication within a sub-network and use higher Layer protocols, such as a network protocol, and the like, for communication across borders of the sub-networks.

In an embodiment, computers owned by people in a workgroup tend to multicast or broadcast more messages to people in the same workgroup than people in the different workgroups. The computers are virtually grouped to form a VLAN that uses multicast or broadcast for communication within the VLAN, and thus network traffic can be reduced by not sending network traffic to other workgroups (e.g., other VLANs). In an example, multiple workgroups or VLANs are configured in the LAN 100. Within a VLAN, data link frames are broadcasted using a Layer 2 protocol, in an embodiment. The VLANs are mutually isolated so that data link frames pass between them using higher level protocols, such as network protocol and the like.

According to an aspect of the disclosure, various reasons make manual path indication by a network administrator difficult, error-prone and time consuming. A network administrator frequently needs path indication information, for example, for trouble shooting, for network upgrading, and the like. In an example, the LAN 100 can include a large number of hosts, such as over hundreds of hosts, and the large number of hosts, in conjunction with numerous intermediate nodes, can form a complicated network and VLAN architecture. Further, VLAN configurations may be frequently changed. Thus, the network administrator may lose track of the changes over a period of time.

According to an aspect of the disclosure, a management application is implemented in the LAN 100. The management application is configured to automatically generate path indications, in response to a request from the network administrator for example. In the FIG. 1 example, a computer H5, labeled with reference numeral 110, is used for network administration and is coupled to port 5 (P5) of the switch device S1.

In the FIG. 1 example, the computer H5 includes a processor 120, a memory module 130 and a user interface module 160 coupled together by a bus 119. The processor 120 executes system and application codes. The memory module 130 stores the system and application codes, such as codes 140 for a management application. In addition, the memory module 130 stores data processed or to be processed by the processor 120. In the FIG. 1 example, the memory module 130 stores a database 150 of network configuration for the LAN 100. The network configuration includes, for example, coupling information of hosts to ports of the switches, coupling pairs of ports of different switches, relationship of workgroups to VLANs, VLAN membership, and the like. The memory module 130 can include any suitable memory, such as a hard disk drive, an optical storage medium, a solid-state drive, and the like.

In an embodiment, the processor 120 executes the codes 140 for the management application to access the database 150, and based on the network configuration generates a path indication. It is noted that the database 150 can be stored in another device in the LAN 100, such as in the switch devices S1, S2, S3 and the like, and can be accessed by the processor 120. The user interface module 160 enables communication between the computer 110 and a user. The user interface module 160 can include any suitable component, such as a touch screen, a display, a keyboard, a mouse, a printer, and the like.

During operation, in an example, the processor 120 executes the codes 140 for the management application. The management application receives a request of path indication from a user, such as a network administrator via the user interface module 160. In another example, the management application receives the request of path indication from another software program application via an application programming interface (API). In an example, the request of path indication includes identifications, such as media access control (MAC) addresses, and the like of two host devices in the LAN 100.

Then, the management application executed on the processor 120 accesses the database 150 to obtain network configuration information to determine a chain of switch devices that form a Layer 2 path for data link frame transmission between the two host devices in the request. In an example, the chain of switch devices is then provided to the user via the user interface module 160. In another example, the chain of switch devices is provided to other software program application via the API.

According to an aspect of the disclosure, the database 150 includes various tables to store the network configuration information.

FIGS. 2A-2D show four tables storing network configuration information for the LAN 100 according to an embodiment of the disclosure.

Figure 2A:

FIG. 2A shows a table example 251 storing host configuration information for the LAN 100 according to an embodiment of the disclosure. The table 251 includes three columns respectively for a host field, a workgroup field and a host connection field. Each row in the table 251 stores information of a host device in the LAN 100. The host field stores a host identification of the host device, such MAC address, and the like. The workgroup field stores an identification of a workgroup to which the host device belongs to. The host connection field stores an identification of a switch device and a port of the switch device to which the host device is connected to. It is noted that a host can belong to multiple workgroups, in an embodiment.

Figure 2B:

FIG. 2B shows a table example 252 storing workgroup and VLAN information for the LAN 100 according to an embodiment of the disclosure. The table 252 includes two columns respectively for a workgroup field and a VLAN ID field. Each row in the table 252 stores a corresponding relationship of a workgroup and a VLAN. The workgroup field stores an identification for a workgroup, and the VLAN ID field stores a VLAN ID corresponding to the workgroup.

FIG. 2C shows a table example 253 storing VLAN membership information for the LAN 100 according to an embodiment of the disclosure. The table 253 includes two columns respectively for a VLAN ID field and a port membership field. Each row in the table 253 stores membership information for a VLAN. The VLAN ID field stores an identification of the VLAN, and the port membership field identifies ports in the switch devices that belong to the VLAN.

FIG. 2D shows a table example 254 storing connectivity information of the switch devices in the LAN 100 according to an embodiment of the disclosure. The table 254 includes four columns respectively for a switch field, a port field, a connected device field, and a connected device type field. Each row stores connectivity information corresponding to a port of a switch device. The switch field stores an identification of the switch device. The port field stores an identification of a port of the switch device. The connected device field stores an identification of a device connected to the port of the switch device. The connected device type field stores a type of the device connected to the port of the switch device.

Figure 3:
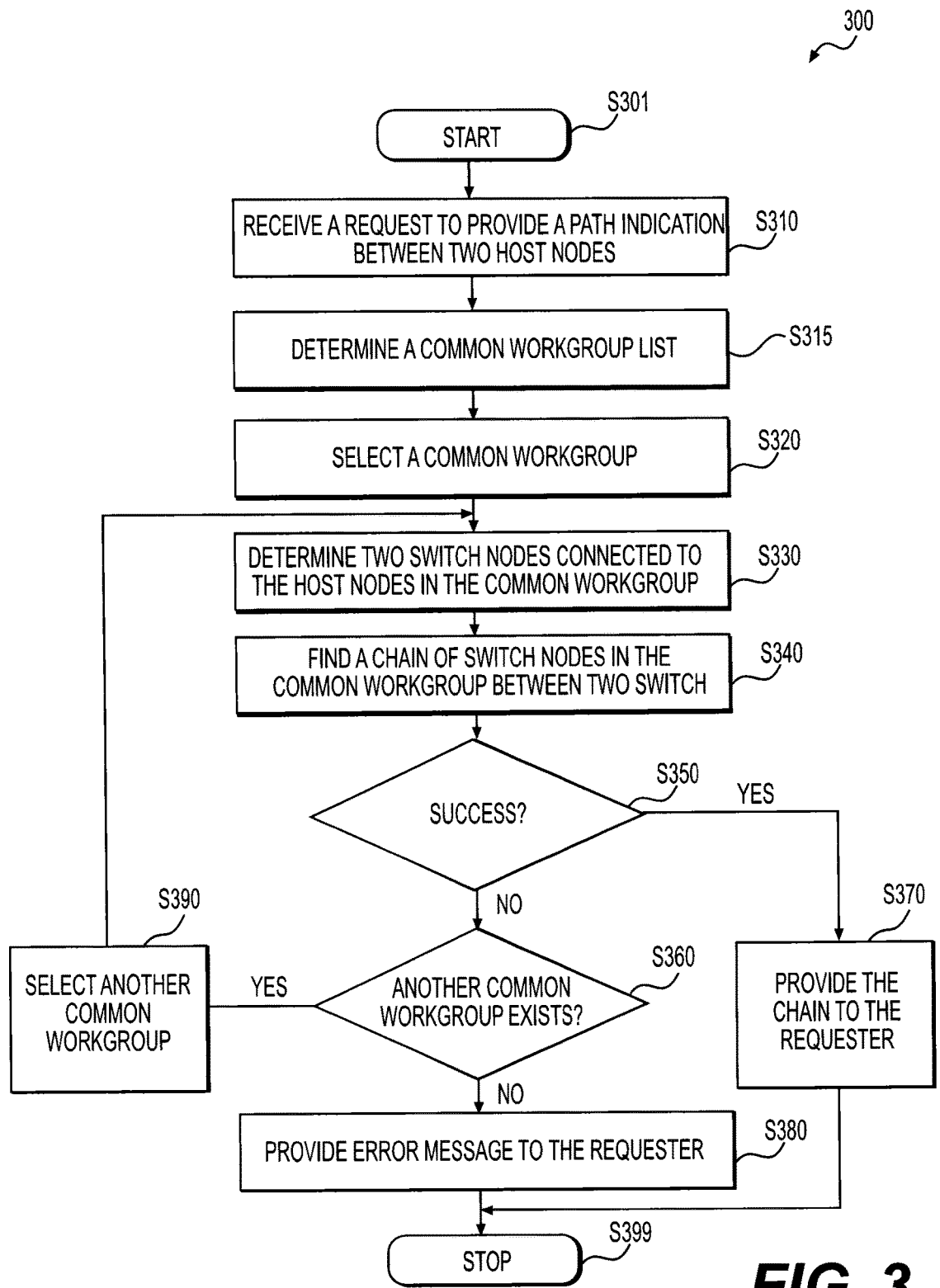
FIG. 3 shows a flow chart outlining a process example 300 according to an embodiment of the disclosure.

FIG. 3 shows a flowchart outlining a process example 300 for path indication according to an embodiment of the disclosure. In an example, the process 300 is performed when the processor 120 executes the codes 140 of the management application to determine a chain of switch devices that forms a Layer 2 path for communication between two host devices. The process starts at S301 and proceeds to S310.

At S310, a request to provide a path indication between two host devices is received. In context of the FIG. 1 example, the processor 120 executes the codes 140 and receives a request for providing a path indication from a network administrator for example. The request identifies two nodes, such as two host devices, such as H3 and H13 in the LAN 100.

At S315, a common workgroup list is determined. In an example, a first workgroup list for the host device H3 and a second workgroup list for the host device H13 are determined. Then, based on the first workgroup list and the second workgroup list, a common workgroup list is determined. For example, based on the table 251, the first workgroup list includes group 2, and the second workgroup list includes group 2. Then, the common workgroup list includes group 2. It is noted that the common workgroup list can include multiple common workgroups. It is also noted that the common workgroup list can be empty.

At S320, a common workgroup is selected. When the common workgroup list includes a single member, such as group 2, in the FIG. 2A example for the host devices H3 and H13, the single member is the selected as the common workgroup. When the common workgroup list includes multiple common workgroups, in an example, the processor 120 provides the common workgroup list to the network administrator to let the network administrator to select a common workgroup. When the common workgroup list is empty, communication between the two host devices has to cross VLAN borders, thus a pure Layer 2 path does not exist for communication between the two host devices, then the process stops and an error message is provided to the network administrator.

At S330, two switch devices connected to the host devices are determined. In the example illustrated in FIGS. 1-2, the switch devices S1 and S3 are determined based on the table 251 for example. As seen in FIG. 2A, the host device H3 is connected to the port 3 of the switch device S1, while the host device 1113 is connected to the port 3 of the switch device S3.

At S340, a chain of switch devices in the same common workgroup between the two switch devices is found. In an embodiment, an algorithm is used to find the chain of switch devices. In an example, the algorithm is a recursive algorithm. In the recursive algorithm, one of the two switch devices is initialized as a starting node. Then, the recursive algorithm is called to determine a next node connected to a port of the starting node that belongs to the same selected common workgroup. Further, the next node is set as the starting node, and the recursive algorithm is called again. The recursive algorithm returns to its previous call when the next node is the other switch device of the two switch devices. Then the chain of switch devices is found. An example of pseudo codes for the recursive algorithm is shown in FIG. 4. It is noted that the recursive algorithm may stop with error. It is also noted that a non-recursive algorithm can be used to find the chain of switch devices.

At S350, the process branches based on the success of finding the chain. When a suitable chain has been successfully found, the process proceeds to S370; otherwise the process proceeds to S360.

At S360, the process branches based on whether another common workgroup exists between the requested hosts. When another common workgroup exists, the process proceeds to S390; otherwise the process proceeds to S380.

At S370, the chain is provided to the requester, such as the network administrator via the user interface module 160. Then the process proceeds to S399 and stops.

At S380, in the absence of another common workgroup, an error message is provided to the requester, and the process proceeds to S399 and stops.

At S390, another common workgroup is selected. In an example, the processor 120 provides the rest of the common workgroups in the common workgroup list to the network administrator to let the network administrator to select a common workgroup from the rest of the common workgroups, and then the process returns to S330.

FIG. 4 shows an example of pseudo codes for an algorithm to find the chain of switch devices. The pseudo codes include a recursive routine and a main program. The main program receives a request that identifies two host devices (H1 and H2). Then, the main program calculates a first workgroup list (L1) for the first host device H1 and a second workgroup list (L2) for the second host device H2. Based on the first workgroup list L1 and the second workgroup list L2, the main program calculates a common workgroup list as an intersection of the two workgroup lists L1 and L2. When the common workgroup list is empty (case 0), the program exits.

When the common workgroup list has one common workgroup (case 1), the common workgroup (WG) is selected. When the common workgroup list has multiple common workgroups, a function (UserSelect) is called to let, for example, the network administrator to select a common workgroup (WG) via the user interface module 160. Further, the main program initializes the current switch (currentSwitch) as a switch device connected to H1 (e.g., via a function call getConnectedSwitch( )), and initializes the target switch (targetSwitch) as a switch connected to H2 (e.g., via a function call getConnectedSwitch ( )). The main program then calls the recursive routine (findSwitch( )).

In the recursive routine (findSwitch( )), for ports in the current switch, when a port of the current switch belongs to the same workgroup (V in the recursive routine) and the port is connected to another switch, the other switch is then set to be the current switch, and the recursive routine is called again. The recursive routine returns when the other switch is the target switch. Then, the chain of switches is formed by appending founded switches by the calling chain of the recursive routine.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for generating a Layer 2 path indication by a processor, comprising:
    receiving, by the processor, a request for providing the Layer 2 path indication between a first host and a second host in a network, the network including a plurality of sub-networks formed by a plurality of nodes, the nodes using a Layer 2 protocol for communicating within a sub-network and using a Layer 3 protocol for communicating across borders of the sub-networks, the nodes belonging to one or more sub-networks;
    determining, by the processor, a first set of sub-networks to which the first host belongs and a second set of sub-networks to which the second host belongs;
    searching for any sub-networks that are common across the first set of sub-networks and the second set of sub-networks;
    when more than one common sub-networks are found, prompting the more than one common sub-networks to a network administrator for the network administrator to select one of the prompted common sub-networks, and when only one common sub-network is found, automatically selecting the one common sub-network;
    determining, by the processor, a first switch node connected to the first host and a second switch node connected to the second host, both the first and second hosts being within the selected common sub-network;
    finding, by the processor, a chain of switch nodes within the first common sub-network between the first switch node and the second switch node to establish a path for communication using the Layer 2 protocol; and
    providing the chain of switch nodes in response to the request to automatically generate a Layer 2 path indication information for managing the network.

2. The method of claim 1, wherein identifying the sub-network within the network to which both the first host and the second host belong further comprises:
    identifying one or more virtual local area networks (VLANs) to which both the first host and the second host belong, each VLAN being specified with at least (a) a VLAN identification and (b) a port membership that lists a plurality of pairs, each pair including (i) a switch node identification and (ii) a port identification associated with the switch node identification.

3. The method of claim 2, wherein identifying the one or more VLANs to which both the first host and the second host belong further comprises:
    determining a first list of workgroups to which the first host belongs;
    determining a second list of workgroups to which the second host belongs;
    determining one or more workgroups that are common to both the first list and the second list; and
    determining the one or more VLANs corresponding to the one or more workgroups.

4. The method of claim 3, wherein determining within the sub-network a sequence of intermediate nodes on the Layer 2 path for data transfer between the first host and the second host further comprises:
    sequentially determining the sequence of intermediate nodes that are connected via ports belonging to the VLAN.

5. The method of claim 4, wherein sequentially determining the sequence of intermediate nodes that are connected via the ports belonging to the VLAN further comprises:
    identifying a port of the first host that belongs to the VLAN; and
    identifying an intermediate node in the sub-network that is connected to the first host via the port.

6. The method of claim 4, wherein sequentially determining the sequence of intermediate nodes that are connected via the ports belonging to the VLAN further comprises:
    using a recursive algorithm to sequentially determine the sequence of intermediate nodes that are connected via the ports belonging to the VLAN.

7. The method of claim 1, wherein
    based on a database of network configuration, identifying the sub-network within the network to which both the first host and the second host belong; and
    based on the database of network configuration, determining within the sub-network a sequence of intermediate nodes on the Layer 2 path for data transfer between the first host and the second host.

8. Apparatus comprising:
    a memory configured to store a database of configurations for a network, the network including a plurality of sub-networks formed by a plurality of nodes, the nodes using a Layer 2 protocol for communicating within a sub-network and using a Layer 3 protocol for communicating across borders of the sub-networks, the nodes belonging to one or more sub-networks;
    a controller configured to:
        receive a request for providing a Layer 2 path indication between a first host and a second host in the network;
        determine a first set of sub-networks to which the first host belongs and a second set of sub-networks to which the second host belongs;
        search for any sub-networks that are common across the first set of sub-networks and the second set of sub-networks;
        when more than one common sub-networks are found, prompting the more than one common sub-networks to a network administrator for the network administrator to select one of the prompted common sub-networks, and when only one common sub-network is found, automatically selecting the one common sub-network;

determine a first switch node connected to the first host and a second switch node connected to the second host, both the first and second hosts being within the selected common sub-network;

find a chain of switch nodes within the first common sub-network between the first switch node and the second switch node to establish a path for communication using the Layer 2 protocol; and provide the chain of switch nodes in response to the request to automatically generate a Layer 2 path indication information for managing the network.

9. The apparatus of claim 8, wherein the controller is configured to identifying one or more virtual local area networks (VLANs) to which both the first host and the second host belong.

10. The apparatus of claim 9, wherein the controller is configured to determine a first list of workgroups to which the first host belongs, determine a second list of workgroups to which the second host belongs, determine one or more workgroups that are common to both the first list and the second list, and determine the one or more VLANs corresponding to the one or more workgroups.

11. The apparatus of claim 10, wherein the controller is configured to sequentially determine a sequence of intermediate nodes that are connected via ports belonging to the VLAN.

12. The apparatus of claim 11, wherein the controller is configured to identify a port of the first host that belongs to the VLAN, and identify an intermediate node in the sub-network that is connected to the first host via the port.

13. The apparatus of claim 11, wherein the controller is configured to use a recursive algorithm to sequentially determine the sequence of intermediate nodes that are connected via the ports belonging to the VLAN.

14. A non-transitory computer readable medium storing program instructions for causing a processor to execute operations for providing a Layer 2 path indication, the operations comprising:

receiving, by the processor, a request for providing the Layer 2 path indication between a first host and a second host in a network, the network including a plurality of sub-networks formed by a plurality of nodes, the nodes using a Layer 2 protocol for communicating within a sub-network and using a Layer 3 protocol for communicating across borders of the sub-networks, the nodes belonging to one or more sub-networks;

determining, by the processor, a first set of sub-networks to which the first host belongs and a second set of sub-networks to which the second host belongs;

searching for any sub-networks that are common across the first set of sub-networks and the second set of sub-networks;

when more than one common sub-networks are found, prompting the more than one common sub-networks to a network administrator for the network administrator to select one of the prompted common sub-networks, and when only one common sub-network is found, automatically selecting the one common sub-network;

determining, by the processor, a first switch node connected to the first host and a second switch node connected to the second host, both the first and second hosts being within the selected common sub-network;

finding, by the processor, a chain of switch nodes within the first common sub-network between the first switch node and the second switch node to establish a path for communication using the Layer 2 protocol; and providing the chain of switch nodes in response to the request to automatically generate a Layer 2 path indication information for managing the network.

15. The non-transitory computer readable medium of claim 14, wherein the operation of identifying the sub-network within the network to which both the first host and the second host belong further comprises:

identifying one or more virtual local area networks (VLANs) to which both the first host and the second host belong.

16. The non-transitory computer readable medium of claim 15, wherein the operation of identifying the one or more VLANs to which both the first host and the second host belong further comprises:

determining a first list of workgroups to which the first host belong;

determining a second list of workgroups to which the second host belong;

determining one or more workgroups that are common to both the first list and the second list; and determining the one or more VLANs corresponding to the one or more workgroups.

17. The non-transitory computer readable medium of claim 16, wherein the operation of determining within the sub-network a sequence of intermediate nodes on the Layer 2 path for packet transfer between the first host and the second host further comprises:

sequentially determining the sequence of intermediate nodes that are connected via ports belonging to the VLAN.

18. The non-transitory computer readable medium of claim 17, wherein the operation of sequentially determining the sequence of intermediate nodes that are connected via the ports belonging to the VLAN further comprises:

identifying a port of the first host that belongs to the VLAN;

identifying an intermediate node in the sub-network that is connected to the first host via the port.

19. The non-transitory computer readable medium of claim 17, wherein the operation of sequentially determining the sequence of intermediate nodes that are connected via the ports belonging to the VLAN further comprises:

using a recursive algorithm to sequentially determine the sequence of intermediate nodes that are connected via the ports belonging to the VLAN.

20. The non-transitory computer readable medium of claim 14, wherein the non-transitory computer readable medium further stores a database of network configuration, and the operations are performed based on the database of the network configuration.

* * * * *